Nov. 14, 1939.  E. A. HANSEN  2,180,320
VALVE
Filed Sept. 15, 1937   2 Sheets-Sheet 1

INVENTOR
ERNEST A. HANSEN
BY Charles S. Evans
HIS ATTORNEY

Nov. 14, 1939.  E. A. HANSEN  2,180,320
VALVE
Filed Sept. 15, 1937  2 Sheets-Sheet 2
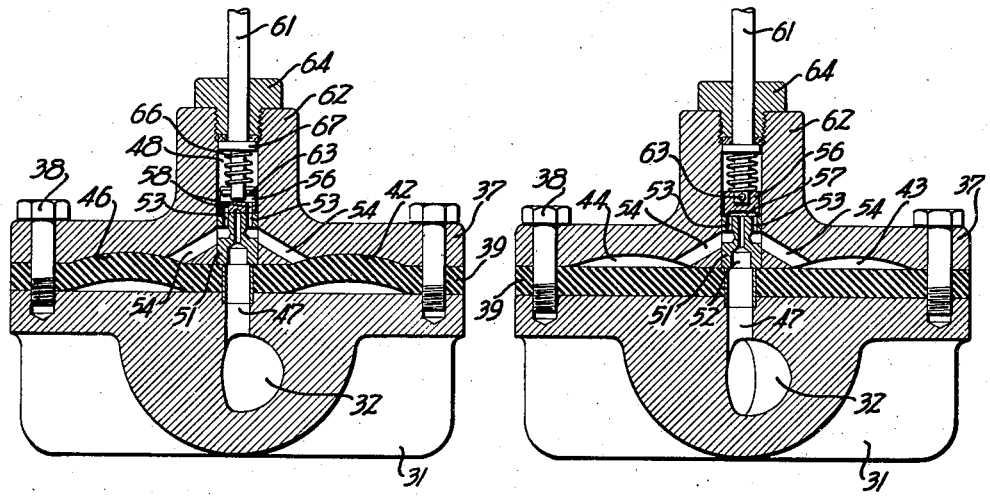
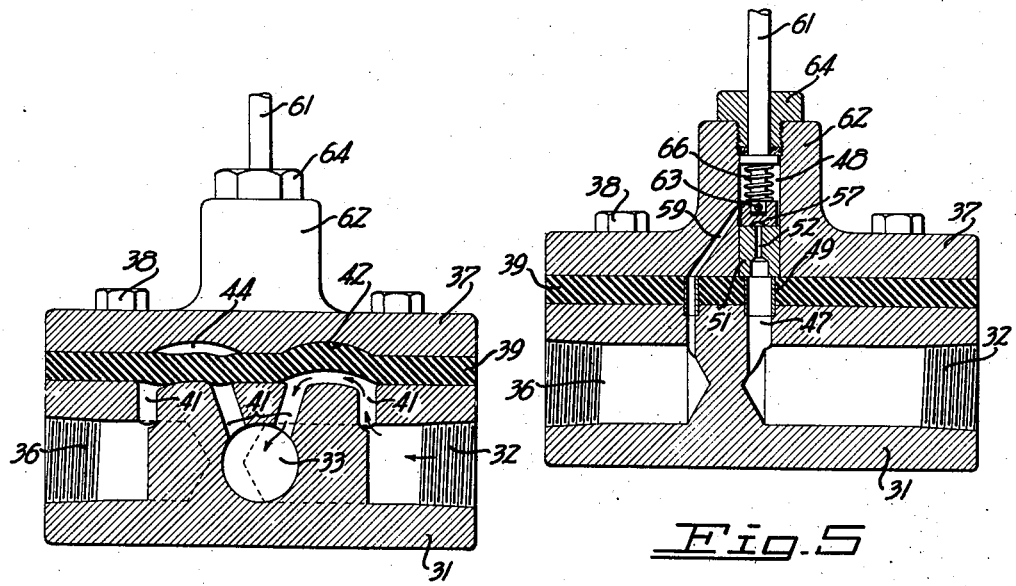
INVENTOR
ERNEST A. HANSEN
BY Charles S. Evans
HIS ATTORNEY Patented Nov. 14, 1939

2,180,320

UNITED STATES PATENT OFFICE 2,180,320

VALVE

Ernest A. Hansen, Oakland, Calif.

Application September 15, 1937, Serial No. 164,004

2 Claims. (Cl. 137—139)

My invention relates to a valve for controlling flow of fluids; and the broad object of the invention is to provide a valve operable by differential pressures on the sides of a diaphragm, whereby a large valve may be controlled by a small pilot valve.

Another object of my invention is to provide a valve of the character described in which the fluid being controlled is utilized as the pressure fluid for actuating the diaphragm.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings.

Figure 2:
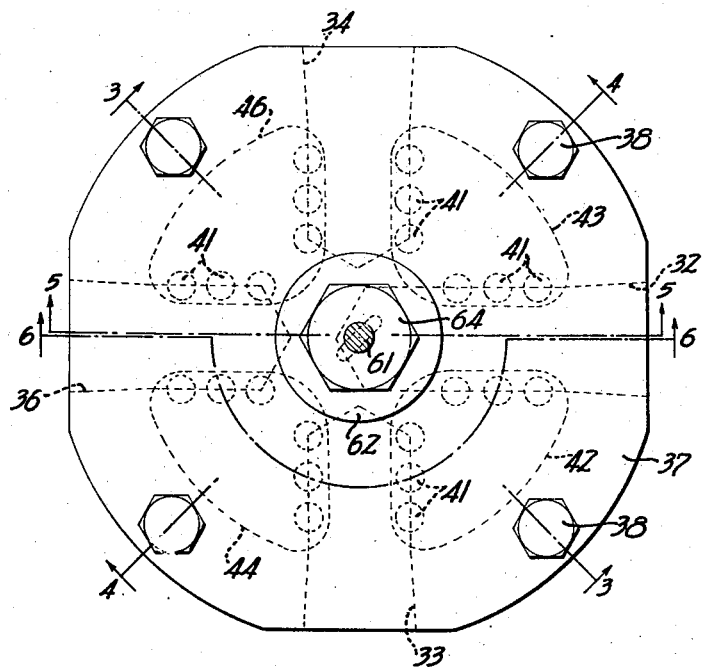
Figure 2 is a plan view of a multiple-way valve embodying my invention.

Figure 3 is a vertical sectional view of the multiple-way valve, taken in a plane indicated by the line 3—3 of Figure 2, and showing two of the control ducts leading from the pilot valve; and Figure 4 is a similar view taken in a plane indicated by the line 4—4 of Figure 2, showing the other two ducts; and Figure 5 is another similar view taken in a plane indicated by the line 5—5 of Figure 2, showing the discharge duct from the pilot valve; and Figure 6 is a vertical sectional view taken in a curved plane indicated by the line 6—6 of Figure 2, showing the ports between the passages.

In terms of broad inclusion, the valve embodying my invention comprises a port, a diaphragm for controlling fluid flow through the port, and means for applying fluid pressure to the diaphragm to close the port. One side of the diaphragm preferably seats directly over the port, and the pressure fluid is applied to the other side of the diaphragm. The pressure fluid is preferably supplied through a small duct leading from the pressure side of the port, and a pilot valve is provided for controlling fluid flow through the duct.

Figure 1:
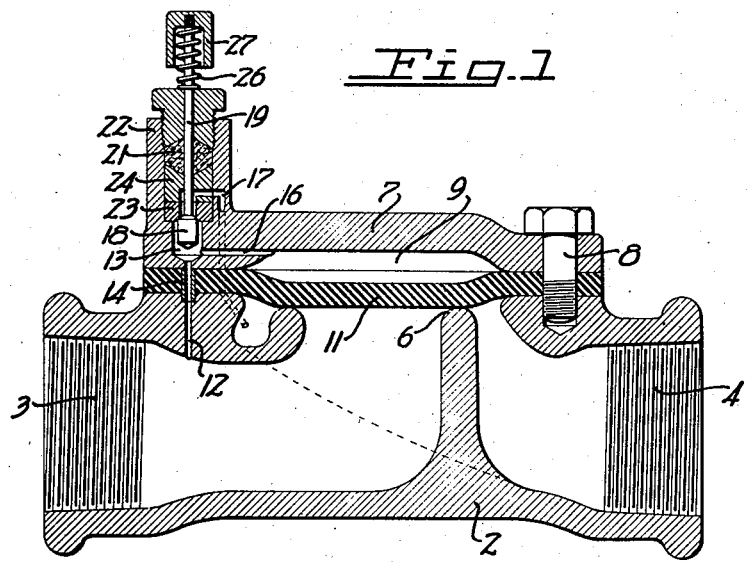
Figure 1 is a longitudinal vertical sectional view of a one-way valve embodying the improvements of my invention.

In greater detail, and referring to Figure 1 of the drawings, the valve embodying my invention comprises a body 2 having an inlet passage 3 and an outlet passage 4. The inlet passage ports into the outlet passage, inside the body, through a circular port 6. This port is adjacent the top of the body, and the body is open above the port.

A head 7 is mounted on the body by suitable studs 8, and is provided with a recess 9 above port 6. A diaphragm 11 of flexible material, such as rubber, is clamped between the body and head to overlie port 6. This diaphragm is adapted to seat over the port to close it, as shown in Figure 1, and is adapted to move up into the recessed head to open the port.

Means are provided for applying a pressure fluid to the top of the diaphragm to close the port. For this purpose a small duct 12 is arranged to communicate with the inlet passage 3, and extends up through the diaphragm to a valve chamber 13 in the head. A sleeve 14 extends through the diaphragm, and prevents the latter from closing the duct when the head is clamped down. From the side of valve chamber 13 a duct 16 leads to recess 9 above the diaphragm, and from the top of the valve chamber a discharge duct 17 leads back into the outlet passage 4.

A pilot valve 18 is provided in chamber 13, and when seated against the top of the chamber, as shown in Figure 1, the discharge duct 17 is closed and passages 12 and 16 open together into recess 9. As a result the fluid from the pressure side of the port is admitted to the recess above the diaphragm, and the pressure of this fluid presses the diaphragm down to close the main valve port. When pilot valve 18 is seated against the bottom of chamber 13 the duct 12 is closed; and at this time side duct 16 is connected with discharge duct 17 by reason of valve 18 being of less diameter than chamber 13. The fluid above the diaphragm then bleeds out and the pressure of the fluid under the diaphragm lifts the latter to open the port.

Pilot valve 18 is mounted on a stem 19 extending through a packing gland 21 provided in a boss 22 on the head. The seat for the upper end of the valve chamber is provided by a disk 23, and connection with discharge duct 17 is made through an apertured spacer 24. This pilot valve may be operated by any suitable means. In the structure shown a spring 26 is compressed between the gland and a cap 27 on the upper end of the stem. This spring holds the pilot valve normally up, and the pressure fluid above the diaphragm keeps the main valve normally closed. When the main valve is to be opened, stem 19 is pressed down by suitable means, such as a lever, bearing down on cap 27. Of course spring 26 may be omitted, if desired, and any suitable handle or actuating element provided for operating the pilot valve. Since the pilot valve is small and operates with little resistance, the valve of my invention is well adapted for automatic control, such as by thermally sensitive or electrical means. Thus, large capacity valves embodying my invention may be controlled by delicate mechanisms.

The valve operates on the principle of pressure differentials. While the pressure fluid on both sides of the diaphragm is derived from a common source, namely the pressure fluid in the line, the pressure conditions obtaining on the two sides of the diaphragm are different. This is due to the fact that the fluid above the diaphragm is confined, and the pressure is static. On the other hand, the fluid below the diaphragm may flow through port 6 and into outlet passage 4. This flow of fluid is along the under surface of the diaphragm, and the reduced pressure due to the velocity of the fluid causes the diaphragm to move down under the static pressure above it. When the pressure above the diaphragm is relieved, the diaphragm moves up and the valve is opened. After the valve is closed the fact that the area to which pressure is applied on the top of the diaphragm is greater than that to which pressure is applied on the underside, holds the valve tightly closed.

Figures 2 to 6 illustrate the application of my improved valve control to a multiple-way valve. The valve here comprises a body 31 having four passages 32, 33, 34 and 36. See Figure 2. Passage 32 is an inlet passage, and the valve is designed to direct fluid from passage 32 into either of passages 33 or 34. The valve is also designed to connect passage 36 with either of the passages 33 or 34. Thus when passages 32 and 33 are connected, passage 36 is connected to passage 34; and when passages 32 and 34 are connected, passage 36 is connected to passage 33.

A head 37 is mounted on the body by suitable studs 38 and a diaphragm 39 is clamped between the head and body. Communication between the passages is effected by ports 41 along the sides of the passages and opening out on the upper surface of the body under the diaphragm. In order to permit the diaphragm to lift from these ports, the under surface of the head is provided with four recesses 42, 43, 44 and 46. These recesses, as shown in Figures 2 and 6, are disposed above the ports between adjacent passages. By this arrangement fluid from a given passage may be directed to a selected one of the adjacent passages, depending upon the position of the portions of the diaphragm above the ports.

The diaphragm is controlled by pressure fluid from inlet passage 32 passing up through a duct 47 into a valve chamber 48 in the head; a sleeve 49 being provided to extend the duct through the diaphragm. A plug 51 is provided in the base of the valve chamber, and has a central aperture 52. A series of four apertures 53 are also provided in the plug, communicating with ducts 54 leading to the four recesses in the head. The several apertures in the plug all open out on its upper surface, and communication between central aperture 52 and apertures 53 is controlled by a rotatable pilot valve 56 having a groove 57 in its lower surface to connect the central aperture 52 with a pair of oppositely disposed apertures 53.

Figure 4 shows the groove connecting the central aperture with the apertures and ducts leading to recesses 43 and 44. In this position the pressure fluid flows into the recesses and presses down the portions of the diaphragm to close the ports between passages 32 and 34, and between passages 33 and 36. Pilot valve 56 also has a pair of apertures 58 on opposite sides of the groove for bleeding fluid from the other recesses 42 and 46 into the top of the valve chamber, from where it is discharged into passage 36 by a duct 59. Thus in the position of the pilot valve shown, the portions of the diaphragm below recesses 42 and 46 are free to move up to open the ports between passages 32 and 33, and between passages 34 and 36. If pilot valve 56 is rotated 90° from the position shown, passages 32 and 34 are connected together, and passages 33 and 36 are connected together.

Means are provided for rotating the pilot valve. For this purpose a stem 61 extends down through a boss 62 formed on the head, and has a pin 63 at its lower end seated in a transverse slot provided in the valve. A cap 64 is threaded in the top of boss 62, and a spring 66 is interposed between a flange 67 on the stem and the valve to hold the latter firmly seated on base plug 51.

This multiple-way valve structure illustrates the possibility of directing fluid from one valve passage into a selected one or more of a plurality of passages, all controlled by a simple easily operated pilot valve.

I claim:

1. A multi-way valve comprising a body having a substantially flat upper surface and passages extending radially inwardly from sides of said body, ports connected with said passages and opening out on said surface of the body, a head overlying said surface and having recesses to provide chambers connecting ports of one passage with ports of an adjacent passage, a diaphragm interposed between said head and body and adapted to seat over said ports, and means for admitting pressure fluid into a selected recess above the diaphragm to close the underlying ports.

2. A multi-way valve comprising a body having a substantially flat upper surface and having pairs of diametrically opposed passages extending radially inwardly from sides of said body, ports connected with said passages and opening out on said surface of the body, a head overlying said surface and having a pair of recesses to provide chambers connecting ports of one of a first pair of passages with ports of a second pair of passages, said head also having another pair of recesses to provide chambers connecting ports of the other of said first pair of passages with ports of the second pair of passages, a diaphragm interposed between said head and body and adapted to seat over said ports, and means for admitting pressure fluid into a selected recess above the diaphragm to close the underlying ports.

ERNEST A. HANSEN.